United States Patent [19]
King, Sr.

[11] 3,779,276
[45] Dec. 18, 1973

[54] DRAINAGE VALVE STRUCTURE
[76] Inventor: Lloyd H. King, Sr., 311 Blake Rd., Hopkins, Minn. 55343
[22] Filed: June 9, 1972
[21] Appl. No.: 261,276

[52] U.S. Cl............. 137/512.4, 251/145, 61/13
[51] Int. Cl............................................ F16k 15/14
[58] Field of Search.............. 137/107, 119, 493.9, 137/512.4, 525, DIG. 4, 517; 251/145, DIG. 3; 220/DIG. 19; 61/13

[56] References Cited
UNITED STATES PATENTS

| | | | |
|---|---|---|---|
| 3,203,602 | 8/1965 | Kryzer | 137/493.9 X |
| 3,456,683 | 7/1969 | Roulet et al. | 137/517 |
| 3,143,135 | 8/1964 | Cornelius | 251/145 X |
| 2,088,248 | 7/1937 | Perry | 137/DIG. 4 |
| 218,024 | 7/1879 | Hennessy et al. | 137/517 X |

Primary Examiner—William R. Cline
Attorney—Leo Gregory

[57] ABSTRACT

A drainage valve structure in connection with a water line of an underground watering system comprising a nipple having an upper and a lower valve seat and corresponding upper and lower valves, said upper valve seating under normal water pressure in said water line and opening said valve automatically under a lesser water pressure and said lower valve seating to close said valve responsive to the pressure of subsurface water to prevent its entrance into said water line.

1 Claim, 7 Drawing Figures

PATENTED DEC 18 1973 3,779,276

DRAINAGE VALVE STRUCTURE

SUMMARY AND BACKGROUND OF THE INVENTION

The invention herein relates to a drainage valve to be used in connection with an underground watering system to permit ready drainage of water from the system as during seasons of freezing temperatures and also to prevent subsurface waters from entering into the system through the drainage valves.

Normally in draining a sprinkling system, air pressure is used to blow the water out of the entire system. This is an operation which is relatively expensive and requires specialized equipment. This procedure is avoided by the use of the valve structure herein.

It is an object of this invention therefore to provide drainage valves for an underground watering system having means therein responsive to normal pressure of water in said system to close said drainage valves, and in the absence of normal pressure of water in said line to automatically open said valves.

It is another object of the invention herein to provide drainage valves for an underground watering system wherein said valves responsive to subsurface water pressure automatically close to prevent the entrance of subsurface waters into said system.

More specifically it is an object of this invention to provide a drainage valve structure for the line of an underground watering system, said drainage valve comprising a valve housing, an upper valve seat and a lower valve seat, a valve member having an upper valve head and a lower valve head, said upper valve head automatically unseating itself in the absence of normal pressure of water in said line to permit the drainage of said line and yielding to normal water pressure to seal said upper valve seat and said lower valve head responds to subsurface water pressures to seal said lower valve seat.

These and other objects and advantages of the invention will be set forth in the following description made in connection with the accompanying drawings in which like reference characters refer to similar parts throughout the several views and in which.

DESCRIPTION OF A PREFERRED EMBODIMENT

Figure 1:
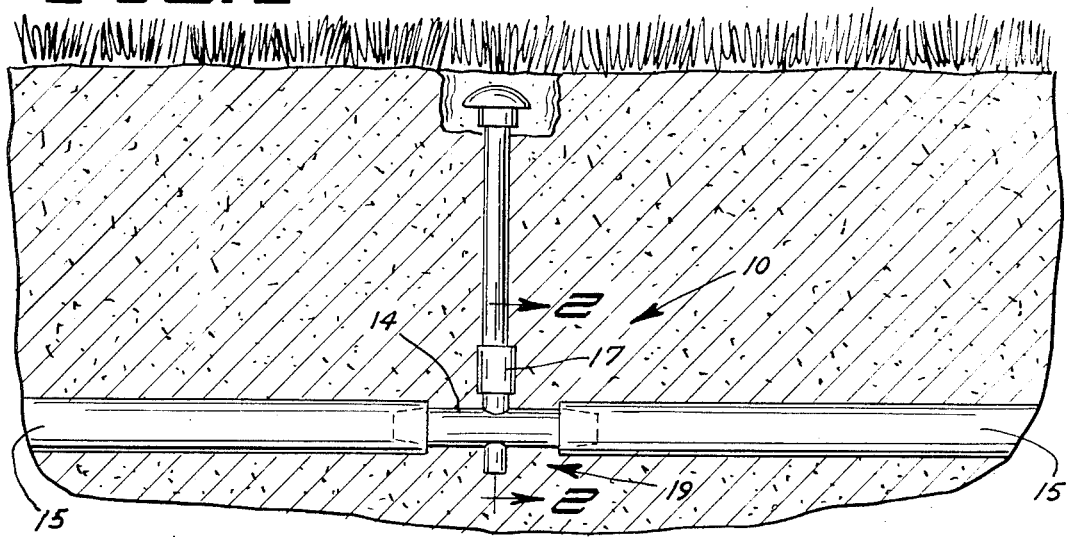
FIG. 1 is a broken view in vertical section showing a portion of an underground water system with the structure herein in operating position.

With reference to the Figs., a portion of an underground watering system 10 is indicated comprising lines 15 connected by a fitting 14 shown here as a T-coupling which has upstanding therefrom a conventional type of sprinkling head 16. Said T-coupling has an uppr boss 17 tapped to receive said sprinkling head 16. Said T-coupling 14 has a cylindrical passage 18 extending therethrough. Said fitting includes an elbow which may be used as the terminal portion of a line.

Depending from said T-coupling is a drainage valve structure 19 which comprises the subject matter of the invention herein and it is shown generally having a housing 20 in the form of a nipple. Said T-coupling has an opening 22 therein to receive said housing which may be secured therein as by a press fit or by the use of a suitable adhesive. Preferably said T-coupling and said valve structure will be formed of a suitable plastic material and are here so indicated. It will be understood that said valve housing may be formed integrally with said coupling as by welding.

Said housing 20 has an axial passage comprising an upper bore portion 24 and a lower counter bore portion 26. Said bore 24 has formed at the upper end portion thereof an upper valve seat 21 and at the lower end thereof has a lower valve seat 27. Said upper valve seat is here shown in the form of a saddle haing a transverse curvature corresponding to the transverse curvature of said passage 18. Said lower valve seat is illustrated here as being conically shaped. It will be understood that said valve seats may have other configurations.

Figure 7:
FIG. 7 is a view in horizontal section taken on line 7—7 of FIG. 6 as indicated.
Figure 6:
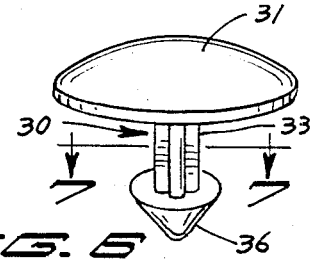
FIG. 6 is a view in perspective of a valve member.

Disposed within said housing 20 is a valve member 30 having an upper valve head 31 which is shown being convexo-concave in form on the order of a dome and extending downwardly therefrom through said passage 24 is a valve stem 33 fluted in cross section as indicated in FIG. 7. Carried at the lower end of said valve stem 33 is a lower valve head 36 shown in the form of a cone having a concave upper surface portion 37 adapted to substantially mate with the curvature of the lower valve seat 27.

Figure 2:
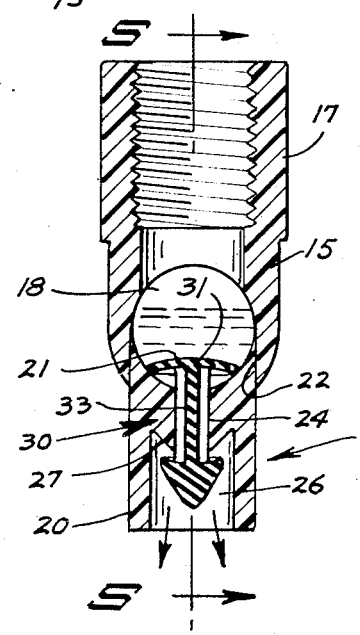
FIG. 2 is a view in vertical section on an enlarged scale taken on line 2—2 of FIG. 1 as indicated.
Figure 3:
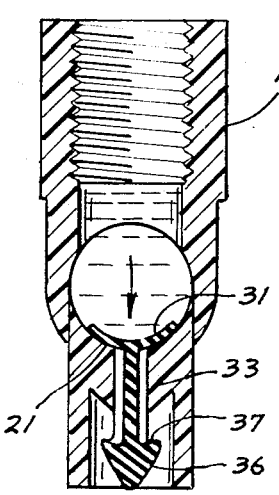
FIG. 3 and FIG. 4 are similar to FIG. 2 showing portions thereof in alternate operating positions.

Said upper valve head 31 is formed of a resilient material such as of suitable plastic material or such as rubber of a sufficient durometer whereby said valve head will normally maintain a convexo-concave form as shown in FIG. 2 but which is of such resilience that it will yield to the operating pressure of the water within the lines of the sprinkling system to become deformed so as to become concavo-convex in cross section as indicated in FIG. 3 to have a sealing engagement with the upper valve seat 21.

OPERATION

During the normal operation of the underground watering system 10, the pressure of the water therein will be sufficient to cause the upper valve head 31 to take on the cross-section form of the upper valve seat 21 as shown in FIG. 3 to seal the valve in closed position.

When it is desired to drain the sprinkling system, the normal supply of water to the system is shut off. There will remain a substantial amount of water within the lines of the system. The drainage valves will be located at low points in the water lines. In the absence of an operating pressure of water, the valve head 31 will flex upwardly away from the upper seat 21 to take on the configuration shown in FIGS. 2 and 5 and thus will open the valve. The valve stem 33 is fluted to permit an easy passage of water through the bore 24. It will be noted that the upper valve head 31 in its upwardly flexed position in which position it is convexo-concave in cross-section it will only engage the side walls of the passage permitting a ready drainage of water through the passage 24 longitudinally of the upper valve head 31.

There will be a sufficient number of drainage valves within the sprinkling system whereby drainage is accomplished through gravity flow.

Provision is also made here to prevent the entrance into the sprinkling system of subsurface water. This could occur at any time when there is less than an operating pressure of water within the system.

Figure 4:
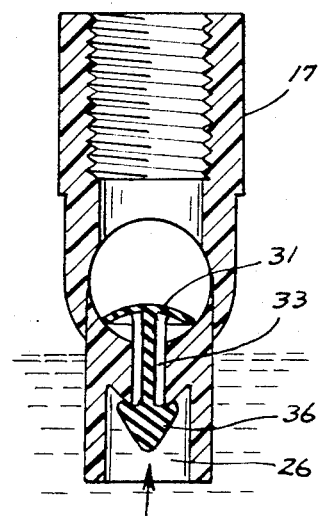
Figure 5:
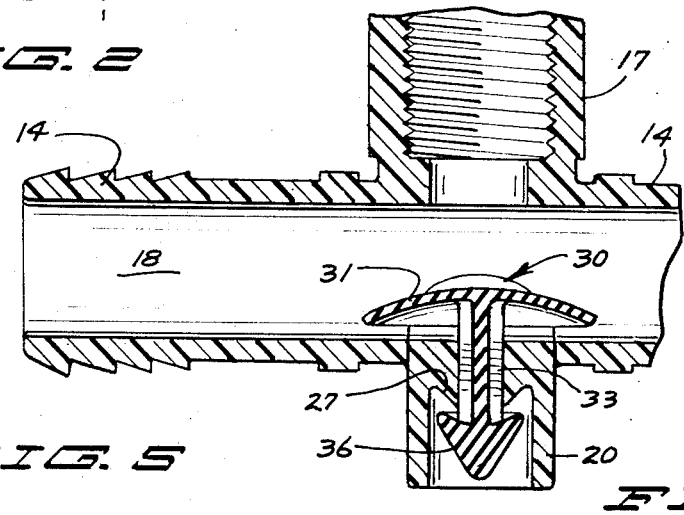
FIG. 5 is a broken view in vertical longitudinal section on an enlarged scale taken on line 5—5 of FIG. 2 as indicated.

As is noted, particularly in view of the valve structure 30 in FIGS. 4 and 5, there is some free axial movement of the valve structure 19. With the entrance of subsurface waters into the counter-bore 26, very little pressure of such water is required to move the valve head 36 upwardly to seat upon the lower valve seat 27 and to seal it against the entrance of any water into the passage 18.

The gravity flow of water draining from the system through the bore 24 generally exerts a greater pressure than that of subsurface waters. Thus there is a substantially complete automatic drainage of water from the sprinkling system and automatic prevention of the entrance of any subsurface waters into the sprinkling system.

The structure comprising the invention herein is very efficient in use and results in the savings of considerable cost of equipment and manpower otherwise required to drain a system, and the use thereof avoids damage resulting from water freezing in the lines.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A drainage valve structure in connection with a water line of an underground sprinkling system having in combination a cylindrical pipe coupling member having a cylindrical bore, a nipple connected with said coupling member having a reduced passage relative to its bore in communication with said bore of said coupling member, said passage having an upper valve seat within said bore of said coupling member and having a transverse curvature corresponding to the transverse curvature of said bore and being flush therewith, said passage having a lower valve seat within the bore of said nipple, a flexible valve head convexo-concave in form being disposed in said housing to overlie said upper valve seat, a valve head within the bore of said nipple to seat on said lower valve seat, a valve stem somewhat greater in length than the length of said passage extending through said passage and connecting said valve heads, and said upper valve head being deformed by normal water pressure of the water present in said coupling member to seat against and seal said upper valve seat and to retain its convexo-concave form under less than normal water pressure to permit the passage of water througe said passage and said lower valve head seating against said lower valve seat in the absence of normal water pressure in said valve housing responsive to the pressure of ground waters.

* * * * *